(12) United States Patent
Bolle et al.

(10) Patent No.: US 11,644,067 B2
(45) Date of Patent: May 9, 2023

(54) DISCONNECT APPARATUS AND A METHOD OF SENSING A STATE THEREOF

(71) Applicant: Dana Automotive Systems Group, LLC, Maumee, OH (US)

(72) Inventors: Korneel Bolle, Ghent (BE); Michael Z. Creech, Ann Arbor, MI (US); Stijn Goossens, Erpe-Mere (BE); Gaurav Krishnaraj, Ypsilanti, MI (US); Mitchell R. Lawson, Perrysburg, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/663,640

(22) Filed: May 16, 2022

(65) Prior Publication Data

US 2022/0275840 A1 Sep. 1, 2022

Related U.S. Application Data

(62) Division of application No. 17/046,716, filed as application No. PCT/US2019/027496 on Apr. 15, 2019, now Pat. No. 11,371,567.

(Continued)

(51) Int. Cl.
*F16D 23/12* (2006.01)
*F16D 21/00* (2006.01)
*F16D 11/10* (2006.01)
*F16D 11/14* (2006.01)
*B60K 17/34* (2006.01)
*B60K 23/08* (2006.01)
*F16D 48/00* (2006.01)

(52) U.S. Cl.
CPC ............. *F16D 23/12* (2013.01); *F16D 11/10* (2013.01); *F16D 11/14* (2013.01); *F16D 21/00* (2013.01);
(Continued)

(58) Field of Classification Search
CPC ...................... F16D 2023/123; F16D 2300/18
See application file for complete search history.

(56) References Cited

U.S. PATENT DOCUMENTS 3,806,785 A * 4/1974 DeValroger ............ H02K 29/12
318/400.2
2015/0107955 A1 4/2015 Trönnberg
(Continued)

FOREIGN PATENT DOCUMENTS

CN 105034796 A 11/2015
CN 107110232 A 8/2017
(Continued)

OTHER PUBLICATIONS

ISA European Patent Office, International Search Report Issued in Application No. PCT/US2019/027496, dated Aug. 14, 2019, WIPO, 19 pages.
(Continued)

*Primary Examiner* — Stacey A Fluhart
(74) *Attorney, Agent, or Firm* — McCoy Russell LLP

(57) ABSTRACT

A disconnect apparatus including a first clutch member and a second clutch member in selective engagement with the first clutch member. The disconnect apparatus also includes a cam mechanism and a sensor assembly. The cam mechanism includes an axially movable first cam member and an axially fixed second cam member. Wherein the sensor assembly generates a pulse pattern which is utilized to determine a position of the first cam member, and thereby a state of the disconnect apparatus.

20 Claims, 12 Drawing Sheets

Related U.S. Application Data

(60) Provisional application No. 62/657,577, filed on Apr. 13, 2018.

(52) U.S. Cl.
CPC .............. *B60K 17/34* (2013.01); *B60K 23/08* (2013.01); *F16D 48/00* (2013.01); *F16D 2023/123* (2013.01); *F16D 2300/18* (2013.01)

(56) References Cited

U.S. PATENT DOCUMENTS

| | | |
|---|---|---|
| 2015/0165901 A1 | 6/2015 | Tamoto et al. |
| 2016/0195145 A1 | 7/2016 | Fujiwara |
| 2016/0369855 A1* | 12/2016 | Essenmacher .......... F16D 28/00 |
| 2019/0024727 A1 | 1/2019 | Lee et al. |
| 2019/0316638 A1 | 10/2019 | Rupp |
| 2021/0050762 A1* | 2/2021 | Tsuchida ............. F04D 29/5806 |

FOREIGN PATENT DOCUMENTS

| | | |
|---|---|---|
| DE | 102014113937 B3 | 3/2016 |
| WO | 2015126809 A1 | 8/2015 |
| WO | 2017075180 A1 | 5/2017 |

OTHER PUBLICATIONS

China National Intellectual Property Administration, Office Action and Search Report Issued in Application No. 201980025537.4, dated Feb. 7, 2022, 16 pages. (Submitted with Partial Translation).

* cited by examiner

DISCONNECT APPARATUS AND A METHOD OF SENSING A STATE THEREOF

CROSS REFERENCE TO RELATED APPLICATIONS

The present application is a divisional of U.S. Non-Provisional patent application Ser. No. 17/046,716, entitled "DISCONNECT APPARATUS AND A METHOD OF SENSING A STATE THEREOF", and filed on Oct. 9, 2020. U.S. application Ser. No. 17/046,716 is a national phase of International Application No. PCT/US2019/027496, entitled "DISCONNECT APPARATUS AND A METHOD OF SENSING A STATE THEREOF", and filed on Apr. 15, 2019. International Application No. PCT/US2019/027496 claims priority to U.S. Provisional Application No. 62/657,577, entitled "CAM MECHANISM POSITION SENSING AND THE DRIVELINE DISCONNECT APPARATUS MADE THEREWITH", and filed on Apr. 13, 2018. The entire contents of the above-listed applications are hereby incorporated by reference for all purpose.

TECHNICAL FIELD

The presently disclosed subject matter relates to a vehicle, and more particularly to a traction device for the vehicle.

BACKGROUND

The present disclosure relates to vehicle systems, and more particularly to disconnect apparatus and a method of sensing a position thereof.

In an all-wheel drive ("AWD") vehicle, a primary wheel-set may be continually connected to a power source of the AWD vehicle while a secondary wheel-set is selectively connected thereto via a disconnect apparatus. The disconnect apparatus may include a clutch mechanism. The disconnect apparatus may disconnect components of the secondary wheel-set and associated driveline, thereby improving a fuel efficiency of the AWD vehicle.

It would be desirable to produce a disconnect apparatus and method of sensing a position thereof, which enhances efficiency and manufacturability, while a cost and weight thereof is minimized.

SUMMARY

In concordance and agreement with the present disclosure, a disconnect apparatus and method of sensing a position thereof, which enhances efficiency and manufacturability, while a cost and weight thereof is minimized, has surprisingly been discovered.

In one embodiment, a disconnect apparatus, comprises: a housing; a first clutch member disposed within said housing; a second clutch member in selective engagement with the first clutch member; a cam mechanism configured to selectively actuate the disconnect apparatus; and a receptacle at least partially disposed about the first clutch member, wherein the receptacle is coupled with the cam mechanism.

In another embodiment, a disconnect apparatus, comprises: a housing; a first clutch member disposed within said housing; an second clutch member in selective engagement with the first clutch member; and a cam mechanism including an axially movable first cam member and a rotatable second cam member, wherein the first cam member is operatively coupled to the second clutch member.

As aspects of certain embodiments, the cam mechanism includes a first cam member and a second cam member.

As aspects of certain embodiments, at least one of the cam members includes at least one ramp formed on an inner surface thereof.

As aspects of certain embodiments, the first cam member is at least partially disposed about the first clutch member.

As aspects of certain embodiments, the second cam member is at least partially disposed about at least one of the first cam member and the first clutch member.

As aspects of certain embodiments, the disconnect apparatus further comprises a first biasing member disposed between the second clutch member and the housing.

As aspects of certain embodiments, the disconnect apparatus further comprises a second biasing member disposed between the second clutch member and the cam mechanism.

As aspects of certain embodiments, the cam mechanism is configured to rotate in only one direction.

In yet another embodiment, a method of sensing a state of a disconnect apparatus, comprises: providing a first clutch member; providing a second clutch member in selective engagement with the first clutch member; providing a cam mechanism configured to selectively actuate the disconnect apparatus; providing a sensor assembly including at least one sensor configured to sense at least one substantially continuous magnetic path; generating a pulse pattern utilizing the at least one sensor of the sensor assembly; and determining a position of the cam mechanism utilizing the pulse pattern.

As aspects of certain embodiments, the at least one sensor is a Hall-effect sensor.

As aspects of certain embodiments, the sensor assembly further includes a sensor element disposed about the cam mechanism.

As aspects of certain embodiments, the at least one substantially continuous magnetic path is formed on at least one of the cam mechanism and the sensor element.

As aspects of certain embodiments, the at least one substantially continuous magnetic path includes at least one North pole and at least one South pole disposed at predetermined intervals about a circumference of the at least one of the cam mechanism and the sensor element.

As aspects of certain embodiments, the method of sensing a state of a disconnect apparatus further comprising the step of determining a state of the disconnect apparatus based upon the position of the cam mechanism.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
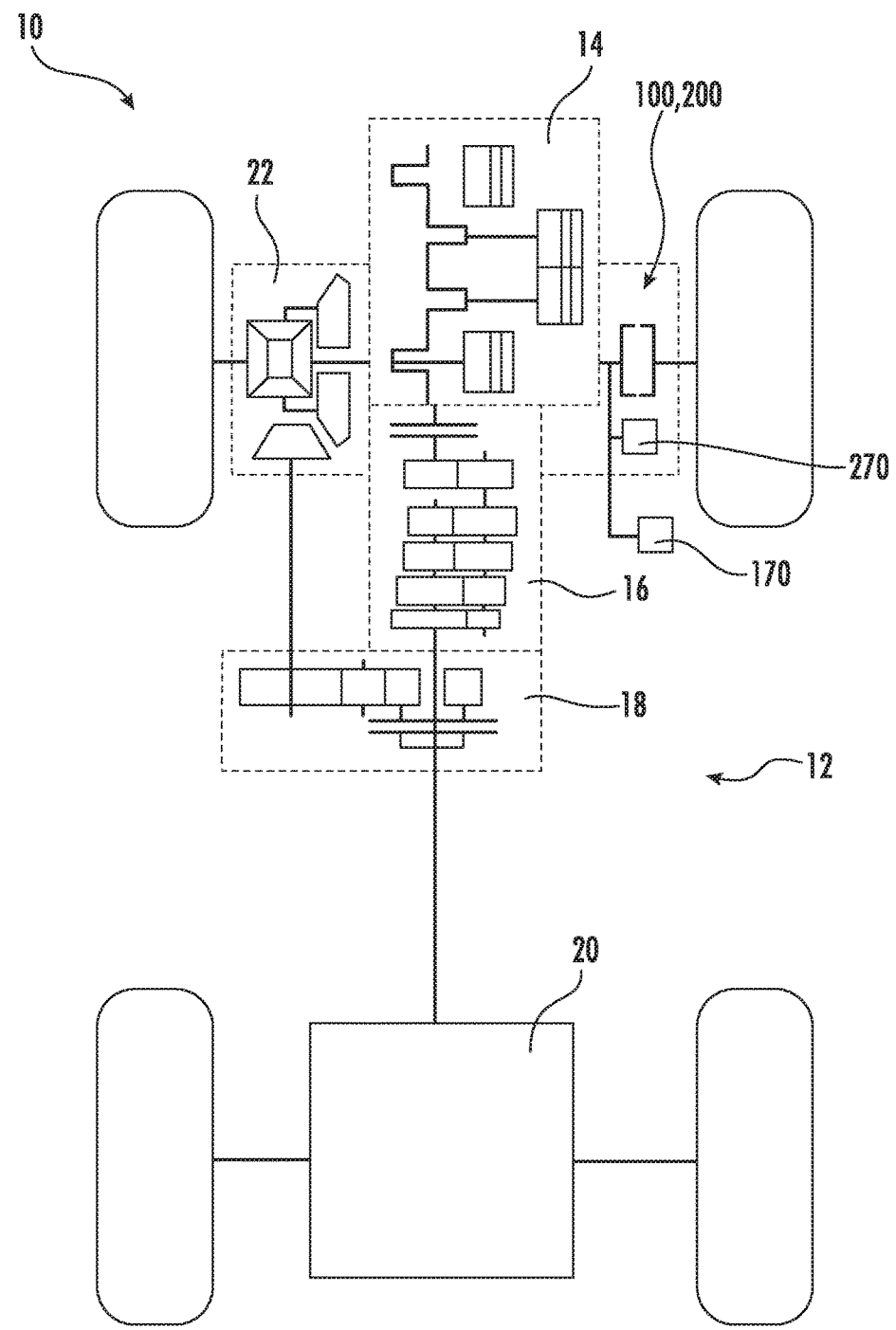
FIG. 1 schematically depicts a vehicle driveline according to an embodiment of the presently disclosed subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 illustrates an AWD vehicle 10 according to the presently disclosed subject matter. Embodiments of disconnect apparatuses 100, 200 are described below. In certain embodiments, the disconnect apparatuses 100, 200 may be utilized within the vehicle 10 shown in FIG. 1. However, control methods utilized with the disconnect apparatuses 100, 200 as disclosed herein may be also be utilized with other cam mechanisms. The control methods may have applications in both light-duty and heavy-duty vehicles, and for passenger, commercial, and off-highway vehicles. Further, the control methods may also have industrial, locomotive, military, agricultural, and aerospace applications, as well as applications in passenger, electric, and autonomous or semi-autonomous vehicles.

As illustrated in FIG. 1, in an embodiment, the vehicle 10 may include a driveline arrangement 12 with a power source 14. The power source 14 may be, but is not limited to, an internal combustion engine or an electric motor. The driveline arrangement 12 may also include a transmission 16 having an input driveably connected to the power source 14 and an output driveably connected to a transfer case 18. The transfer case 18 including a first output continuously driveably connected to a rear drive unit 20 and a second output selectively driveably connected to a front drive unit 22.

The front drive unit 22 comprising a differential mechanism which is driveably connected to a primary wheel-set and one of the disconnect apparatuses 100, 200. When utilized in conjunction with a clutch mechanism in the transfer case 18, the disconnect apparatuses 100, 200 provide improved fuel economy by disconnecting AWD driveline components when AWD functionality is not required.

Figure 2:
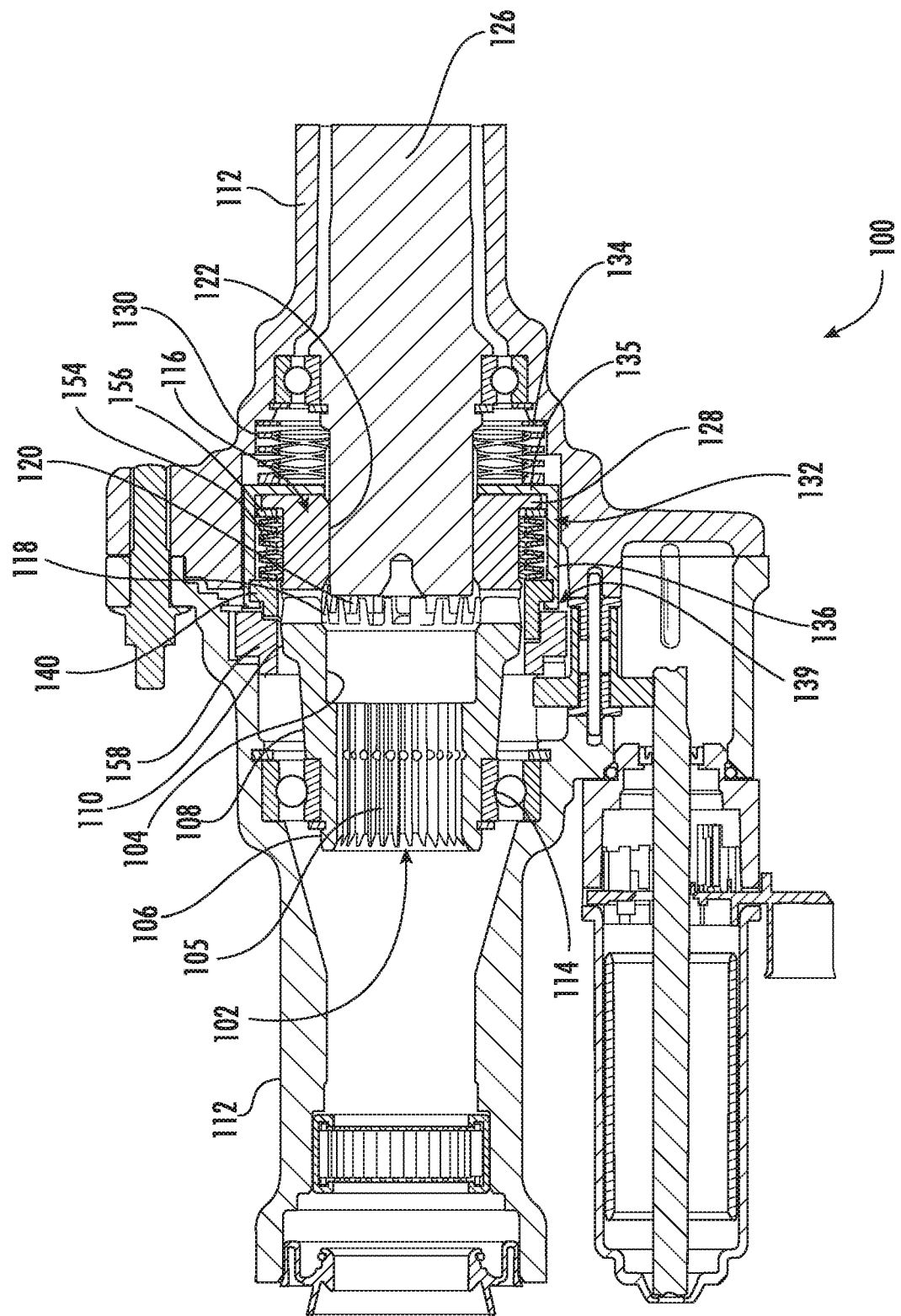
FIG. 2 is a cross-sectional view of a disconnect apparatus according to an embodiment of the presently disclosed subject matter.
Figure 3:
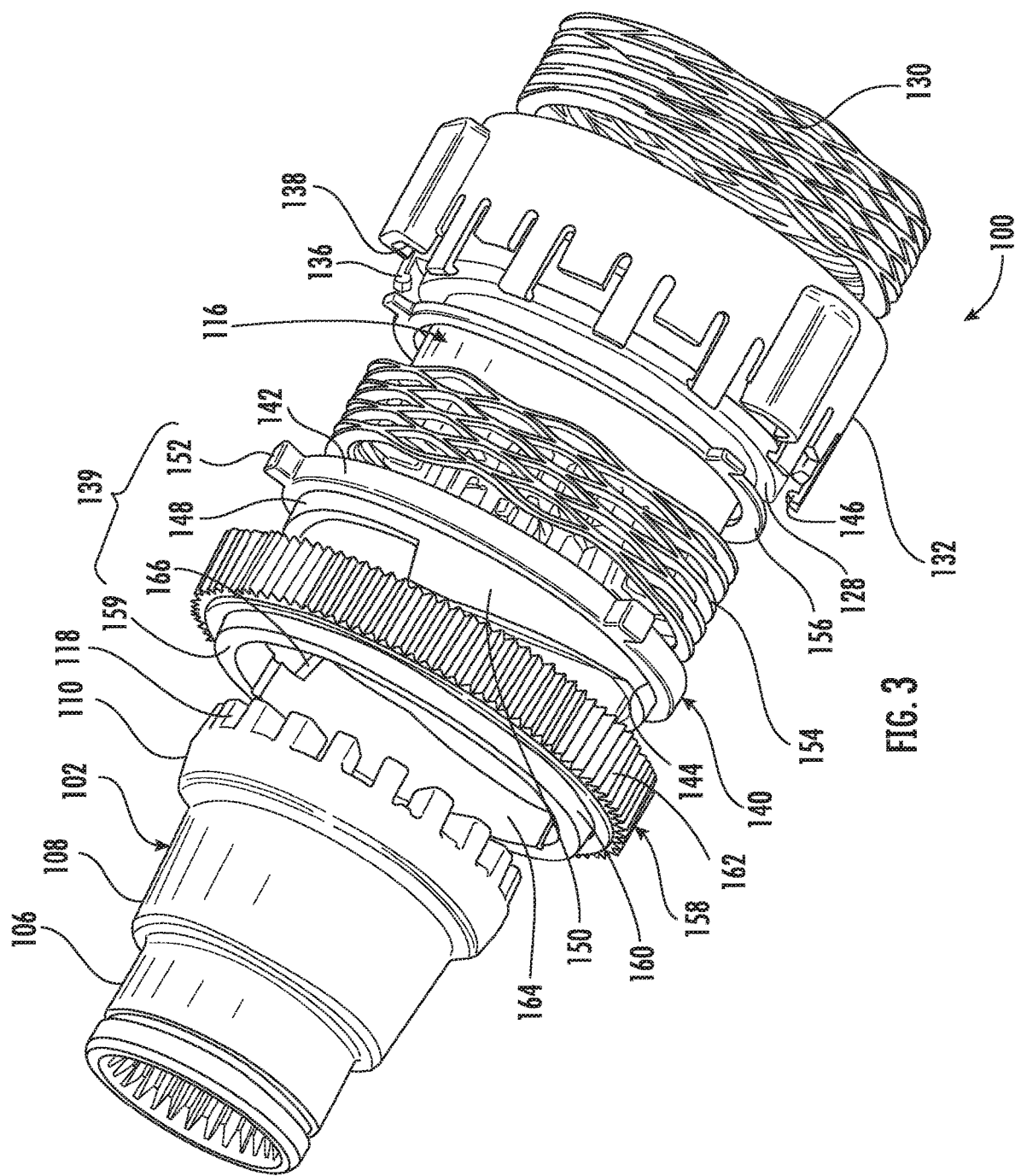
FIG. 3 is an exploded perspective view of the disconnect apparatus shown in FIG. 2.
Figure 5:
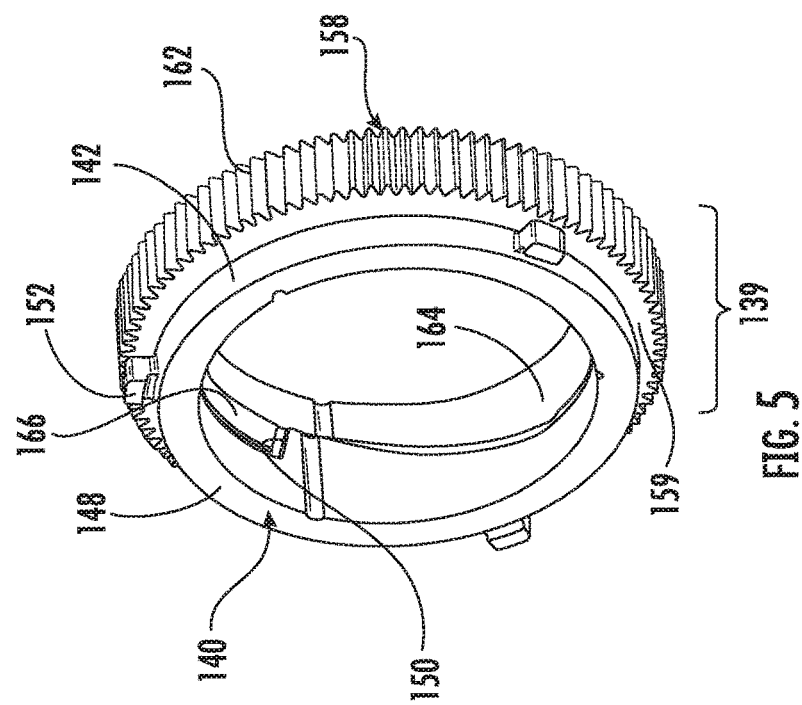
FIG. 5 is a perspective view of a cam mechanism included in the disconnect apparatus shown in FIGS. 2-4.

FIGS. 2 and 3 illustrate the disconnect apparatus 100 according to an embodiment of the present disclosure. The disconnect apparatus 100 shown is configured to connect and disconnect components (e.g. axle half shafts) in the vehicle 10. It should be appreciated, however, that the disconnect apparatus 100 may be employed to connect and disconnect components of any suitable application as desired. The disconnect apparatus 100 includes a first clutch member 102 and a second clutch member 116. The first clutch member 102 shown has a generally cylindrical shape and includes a radially inner surface 104. In certain embodiments, the radially inner surface 104 includes a plurality of splines 105 formed thereon. The first clutch member 102 may receive therein and be in splined engagement with a first component (not depicted) such as a first axle half shaft. In certain embodiments, the first clutch member 102 is rotatably and axially fixed to the first component. It is understood that the first clutch member 102 may be fixedly coupled to the first component by any suitable method as desired.

The first clutch member 102 may further include a first portion 106, a second portion 108, and a third portion 110. Although the portions 106, 108, 110 shown are integrally formed, it is understood that the portion 106, 108, 110 may be formed as separate and distinct elements if desired. In one particular embodiment, the third portion 110 has an outer diameter greater than an outer diameter of the second portion 108, and the second portion 108 has an outer diameter greater than the outer diameter of the first portion 106. The second portion 108 shown is disposed axially between the first and third portions 106, 110. It should be appreciated that each of the portions 106, 108, 110 may have any shape and size as desired. For example, the outer diameters of the portions 106, 108, 110 may be substantially equivalent.

The first clutch member 102 may be rotatably supported within a housing 112 via a bearing 114 disposed about a radially outer surface of the first portion 106. Various types of bearings may be employed as the bearing 114 such as a roller bearing, a ball bearing, a tapered bearing, and the like, for example. The first clutch member 102 may be selectively engageable with the second clutch member 116. Referring to FIG. 3, the first clutch member 102 includes axially extending clutch teeth 118, which are configured to selectively engage with axially extending and complimentary clutch teeth 120 formed on the second clutch member 116. Any number, shape, and configuration of the clutch teeth 118, 120 may be employed as desired.

As illustrated in FIGS. 2 and 3, the second clutch member 116 has a generally cylindrical shape and includes a radially inner surface 122. In certain embodiments, the radially inner surface 122 includes a plurality of splines (not depicted) formed thereon. The second clutch member 116 may receive therein and be in splined engagement with a second component 126 such as a second axle half shaft or link shaft, for example, for axial translation thereon. In certain embodiments, the second clutch member 116 is rotatably fixed and slidably coupled to the second component 126. It is understood that the second clutch member 116 may be slidably coupled to the second component 126 by any suitable method as desired.

The second clutch member 116 may further include a radially extending flange 128. A first biasing member 130 is disposed at least partially about the second clutch member 116. The first biasing member 130 is further disposed on a side of the flange 128 opposite the first clutch member 102. The first biasing member 130 abuts a surface of the housing 112 at a first end, and a receptacle 132 at a second end. The first biasing member 130 is configured to urge the second clutch member 116 in a first axial direction from a disengaged or first position to an engaged or second position, causing the disconnect apparatus 100 to be engaged. In an embodiment, an antifriction member 134 such as a thrust washer, for example, may be disposed axially between the first end of the first biasing member 130 and the housing 112. The receptacle 132 may have generally cylindrical shape and may be disposed at least partially about the second clutch member 116.

A radially inward extending flange 135 of the receptacle 132 is disposed axially between the flange 128 of the second clutch member 116 and the first biasing member 130. The receptacle 132 further includes a plurality of leg members 136 extending axially outward from an edge of the receptacle 132 opposite the flange 135 formed thereon. Although the leg members 136 shown have a generally L-shaped cross-sectional shape with a tab 146 formed thereon, it is understood that each of the leg members 136 may have any shape and size as desired. One or more axially extending slots 138 may also be formed in an outer peripheral wall of the receptacle 132. In one embodiment, the leg members 136 and the slots 138 may be formed at predetermined intervals about a circumference of the receptacle 132. It should be appreciated, however, that the leg members 136 and the slots 138 may be formed at various intervals about the circumference of the receptacle 132 as desired.

The disconnect apparatus 100 further includes a cam mechanism 139. The cam mechanism shown includes an axially movable first cam member 140 and an axially fixed, rotatable second cam member 158. The first cam member 140 may be disposed at least partially about a radially outer surface of the first clutch member 102 and a radially outer surface of the second clutch member 116. The first cam member 140 is configured to translate in the first axial direction and in an opposite second axial direction. The first cam member 140 may include an annular body 148 having a radially outer surface 142. An annular shoulder 144 may be formed in the annular body 148. In certain embodiments, the first cam member 140 is coupled to the receptacle 132. As illustrated in FIG. 2, the annular shoulder 144 of the first cam member 140 is configured to receive at least a portion of the leg members 136 of the receptacle 132. In an example, the annular shoulder 144 of the first cam member 140 retains the tab 146 of the leg members 136 thereon.

A plurality of cam ramps 150 may axially extend from a surface of the annular body 148 of the first cam member 140. In one embodiment the annular body 148 includes three cam ramps 150 formed thereon. It is understood, however, that the annular body 148 may include any number of camp ramps 150 as desired. One or more radially extending protuberances 152 may also be formed on an outer peripheral surface of the annular body 148. In one embodiment, the protuberances 152 may be formed at predetermined intervals about a circumference of the annular body 148. It should be appreciated, however, that the protuberances 152 may be formed at various intervals about the circumference of the annular body 148 as desired. The protuberances 152 of the first cam member 140 are configured to be received in the slots 138 of the receptacle 132 such that the receptacle 132 and the first cam member 140 are rotationally fixed with each other.

A second biasing member 154 is disposed radially between the receptacle 132 and the second clutch member 116. The second biasing member 154 is axially disposed between the flange 128 of the second clutch member 116 and the first cam member 140. The second biasing member 154 is configured to urge the second clutch member 116 in the second axial direction from the first position to the second position, causing the disconnect apparatus 100 to be disengaged. In an embodiment, an antifriction member 156 such as a thrust washer, for example, may be disposed axially between the second biasing member 154 and the flange 128 of the second clutch member 116.

Figure 4:
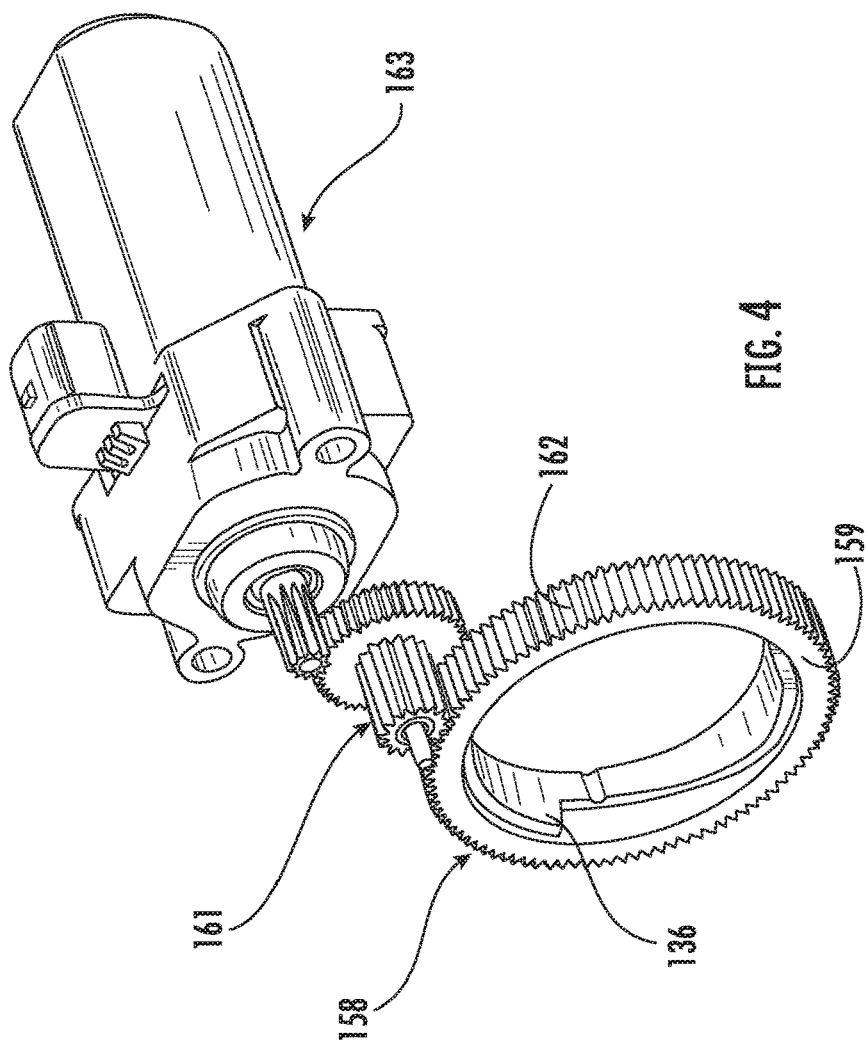
FIG. 4 is a perspective view of a portion of the disconnect apparatus shown in FIGS. 2-3.

As shown, the second cam member 158 is rotatably disposed about the first clutch member 102. The second cam member 158 may include an annular body 159. In certain embodiments, a radially outer surface 160 of the annular body 159 may include a plurality of gear teeth 162 formed thereon. As illustrated in FIG. 4, the gear teeth 162 may be configured to be engaged with a gear arrangement 161 driven by an electric motor 163. A plurality of cam ramps 166 may axially extend from a radially inner surface 164 of the annular body 159. In one embodiment, the annular body 159 includes three cam ramps 166 formed thereon. It is understood, however, that the annular body 159 may include any number of camp ramps 166 as desired. The cam ramps 166 of the second cam member 158 may be configured to be complimentary to the cam ramps 150 of the first cam member 140. The electric motor 163 may be in electrical communication with a controller 170 (see FIG. 1). The controller 170 determines an operation of the electric motor 163 and a state (e.g. engaged and disengaged) of the disconnect apparatus 100.

Figure 6:
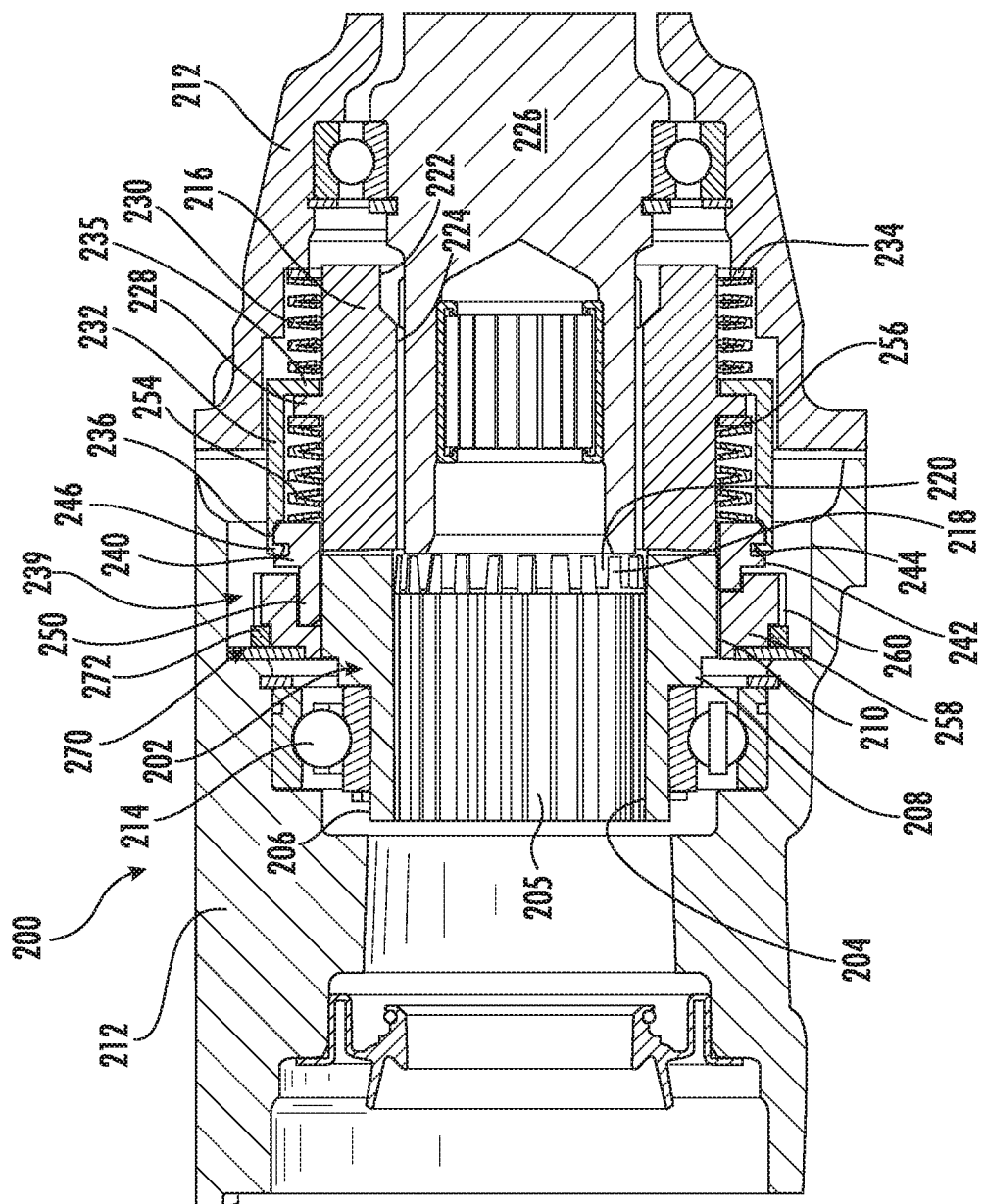
FIG. 6 is a cross-sectional view of a disconnect apparatus according to another embodiment of the presently disclosed subject matter.
Figure 7:
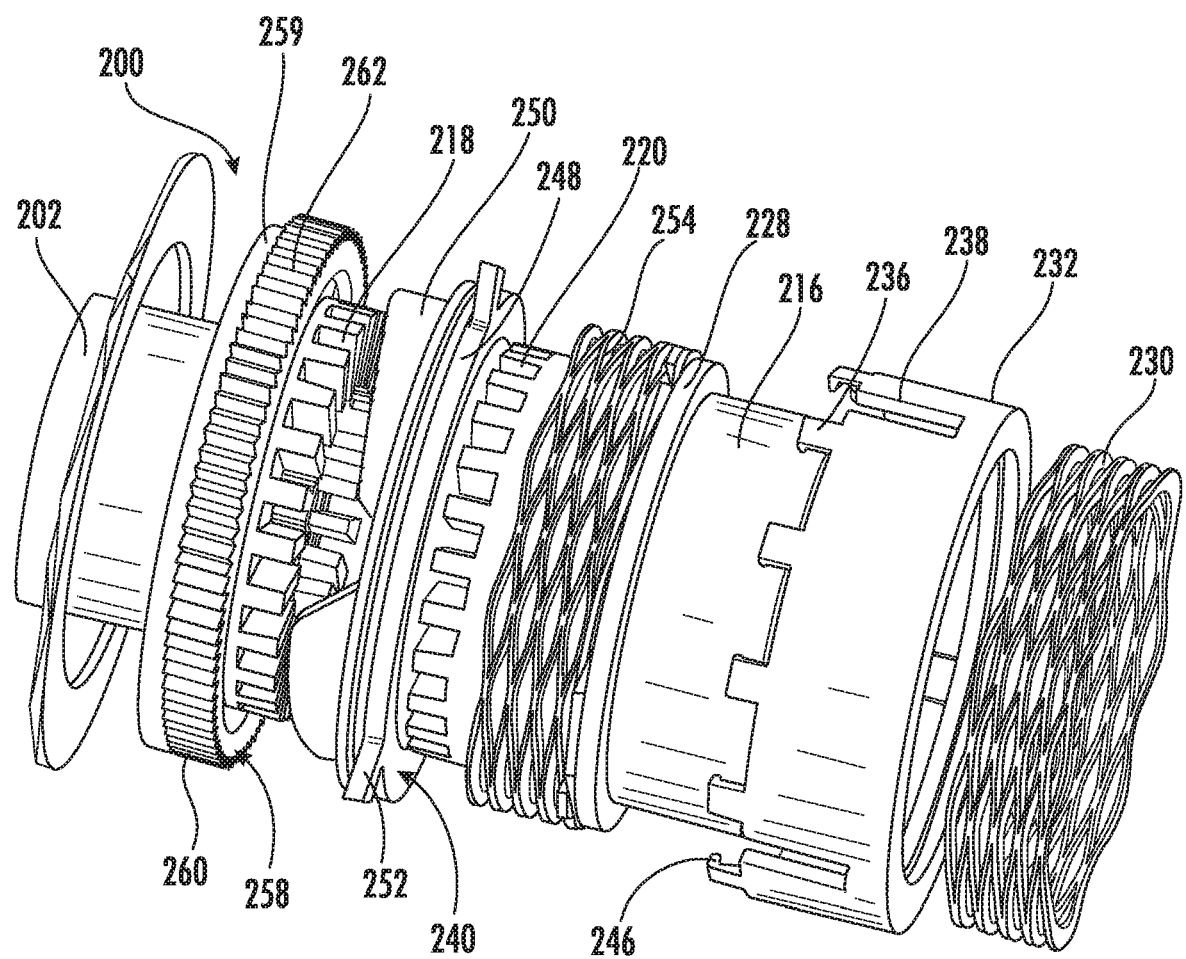
FIG. 7 is an exploded perspective view of a portion of the disconnect apparatus shown in FIG. 6.

Referring now to FIGS. 6 and 7, the disconnect apparatus 200 is illustrated according to another embodiment of the present disclosure. The disconnect apparatus 200 shown is configured to connect and disconnect components (e.g. axle half shafts) in the vehicle 10. It should be appreciated, however, that the disconnect apparatus 200 may be employed to connect and disconnect components of any suitable application as desired. The disconnect apparatus 200 includes a first clutch member 202 and a second clutch member 216. The first clutch member 202 shown has a generally cylindrical shape and includes a radially inner surface 204. In certain embodiments, the radially inner surface 204 includes a plurality of splines 205 formed thereon. The first clutch member 202 may receive therein and be in splined engagement with a first component (not depicted) such as a first axle half shaft. In certain embodiments, the first clutch member 202 is rotatably and axially fixed to the first component. It is understood that the first clutch member 202 may be fixedly coupled to the first component by any suitable method as desired.

The first clutch member 202 may further include a first portion 206, a second portion 208, and a third portion 210. The portions 206, 208, 210 shown are integrally formed. However, it is understood that the portion 206, 208, 210 may be formed as separate and distinct elements. In one particular embodiment, the third portion 210 has an outer diameter greater than an outer diameter of the second portion 208, and the second portion 208 has an outer diameter greater than the outer diameter of the first portion 206. The second portion 208 shown is disposed axially between the first and third portions 206, 210. It is further understood that each of the portions 206, 208, 210 may have any shape and size as desired. For example, the portion 206, 208, 210 may have substantially equal outer diameters thereof.

The first clutch member 202 may be rotatably supported within a housing 212 via a bearing 214 disposed about a radially outer surface of the first portion 206. Various types of bearings may be employed as the bearing 214 such as a roller bearing, a ball bearing, a tapered bearing, and the like, for example. The first clutch member 202 may be selectively engageable with the second clutch member 216. Referring to FIG. 7, the first clutch member 202 includes axially extending clutch teeth 218, which are configured to selectively engage with axially extending and complimentary clutch teeth 220 formed on the second clutch member 216. As illustrated in FIGS. 6 and 7, the second clutch member 216 has a generally cylindrical shape and includes a radially inner surface 222. In certain embodiments, the radially inner surface 222 includes a plurality of splines 224 formed thereon. The second clutch member 216 may be in splined engagement with a second component 226 such as an axle half shaft or a link shaft, for example, for axial translation thereon. In certain embodiments, the second clutch member 216 is rotatably fixed and slidably coupled to the second component 226. It is understood that the second clutch member 216 may be slidably coupled to the second component 226 by any suitable method as desired.

The second clutch member 216 may further include a radially extending flange 228. A first biasing member 230 is disposed at least partially about the second clutch member 216. The first biasing member 230 is further disposed on a side of the flange 228 opposite the first clutch member 202. The first biasing member 230 abuts a surface of the housing 212 at a first end, and a receptacle 232 at a second end. The first biasing member 230 is configured to urge the second clutch member 216 in a first axial direction from a disengaged or first position to an engaged or second position, causing the disconnect apparatus 200 to be engaged. In an embodiment, an antifriction member 234 such as a thrust washer, for example, may be disposed axially between the first end of the first biasing member 230 and the housing 212. The receptacle 232 may have generally cylindrical shape and may be disposed at least partially about the second clutch member 216.

A radially inward extending flange 235 of the receptacle 232 is disposed axially between the flange 228 of the second clutch member 216 and the first biasing member 230. The receptacle 232 further includes a plurality of leg members 236 extending axially outward from an edge of the receptacle 232 opposite the flange 235 formed thereon. Although the leg members 236 shown have a generally L-shaped cross-sectional shape with a tab 246 formed thereon, it is understood that each of the leg members 236 may have any shape and size as desired. One or more axially extending slots 238 may also be formed in an outer peripheral wall of the receptacle 232. In one embodiment, the leg members 236 and the slots 238 may be formed at predetermined intervals about a circumference of the receptacle 232. It should be appreciated, however, that the leg members 236 and the slots 238 may be formed at various intervals about the circumference of the receptacle 232 as desired.

The disconnect apparatus 200 further includes a cam mechanism 239. The cam mechanism 239 includes an axially movable first cam member 240 and an axially fixed, rotatable second cam member 258. The first cam member 240 may be disposed at least partially about a radially outer surface of the first clutch member 202 and a radially outer surface of the second clutch member 216. The first cam member 240 is configured to translate in the first axial direction and in the second axial direction. The first cam member 240 may include an annular body 258 having a radially outer surface 242. An annular groove 244 may be formed in the annular body 248. In certain embodiments, the first cam member 240 is coupled to the receptacle 232. As illustrated in FIG. 6, the annular groove 244 of the first cam member 240 is configured to receive at least a portion of the leg members 236 of the receptacle 232 therein. In an example, the annular groove 244 of the first cam member 240 receives the tab 246 of the leg members 236 therein.

A plurality of cam ramps 250 may axially extend from a surface of the annular body 248 of the first cam member 240. In one embodiment the annular body 248 includes three cam ramps 250 formed thereon. It is understood, however, that the annular body 248 may include any number of camp ramps 250 as desired. One or more radially extending protuberances 252 may also be formed on an outer peripheral surface of the annular body 248. In one embodiment, the protuberances 252 may be formed at predetermined intervals about a circumference of the annular body 248. It should be appreciated, however, that the protuberances 252 may be formed at various intervals about the circumference of the annular body 248 as desired. The protuberances 252 of the first cam member 240 are configured to be received in the slots 238 of the receptacle 232 such that the receptacle 232 and the first cam member 240 are rotationally fixed with each other.

A second biasing member 254 is disposed radially between the receptacle 232 and the second clutch member 216. The second biasing member 254 is axially disposed between the flange 228 of the second clutch member 216 and the first cam member 240. The second biasing member 254 is configured to urge the second clutch member 216 in the second axial direction from the first position to the second position, causing the disconnect apparatus 200 to be disengaged. In an embodiment, an antifriction member 256 such as a thrust washer, for example, may be disposed axially between the second biasing member 254 and the flange 228 of the second clutch member 216.

Figure 8:
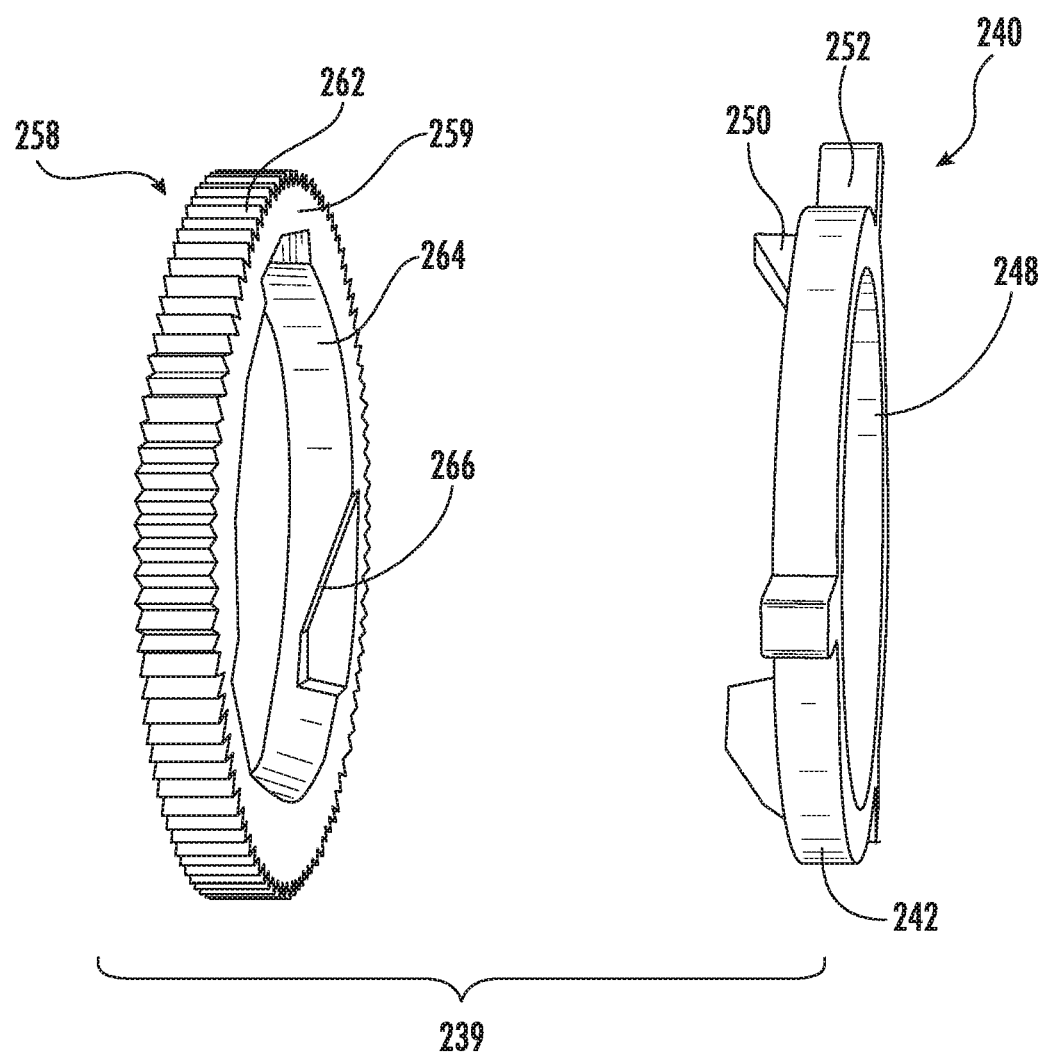
FIG. 8 is a perspective view of a cam mechanism included in the disconnect apparatus shown in FIGS. 6-7.

As illustrated, the second cam member 258 is rotatably disposed about the first clutch member 202. The second cam member 258 may include an annular body 259. In certain embodiments, a radially outer surface 260 of the annular body 259 may include a plurality of gear teeth 262 formed thereon. The gear teeth 262 may be configured to be engaged with a gear arrangement (not depicted) driven by an electric motor (not depicted). A plurality of cam ramps 266, shown in FIG. 8, may axially extend from a radially inner surface 264 of the annular body 259. In one embodiment, the annular body 259 includes three cam ramps 266 formed thereon. It is understood, however, that the annular body 259 may include any number of camp ramps 266 as desired. The cam ramps 266 of the axially fixed cam 258 may be configured to be complimentary to the cam ramps 250 of the first cam member 240. The electric motor may be in electrical communication with the controller 170 (see FIG. 1). The controller 170 determines an operation of the electric motor and a state (e.g. engaged and disengaged) of the disconnect apparatus 200.

It should be appreciated that an operation of the disconnect apparatus 100 is substantially similar to an operation of the disconnect apparatus 200. For simplicity, only the operation of the disconnect apparatus 100 is described hereinafter.

In operation, to disconnect the torque transfer between the second component 126 and the first component, the electric motor rotates the second cam member 158. Rotation of the second cam member 158 causes the first cam member 140 to actuate via the cam ramps 150, 166. Actuating the first cam member 140 compresses the second biasing member 154 during events where torque across the first clutch member 102 and the second clutch member 116 is too high to allow for immediate disengagement. As the second clutch member 116 is axially translated via the first cam member 140 and the second biasing member 154, the first biasing member 130 is compressed and the clutch teeth 120 of the second clutch member 116 disengage from the clutch teeth 118 of the first clutch member 102.

In operation, to connect the torque transfer between the second component 126 and the first component, the electric motor rotates the axially fixed, rotatable cam 158 in the same direction as during the disconnect event described above. The first biasing member 130 decompresses and axially translates the second clutch member 116 until the clutch teeth 118, 120 are engaged, and the cam ramps 150, 166 are in an engaged position.

Figure 9:
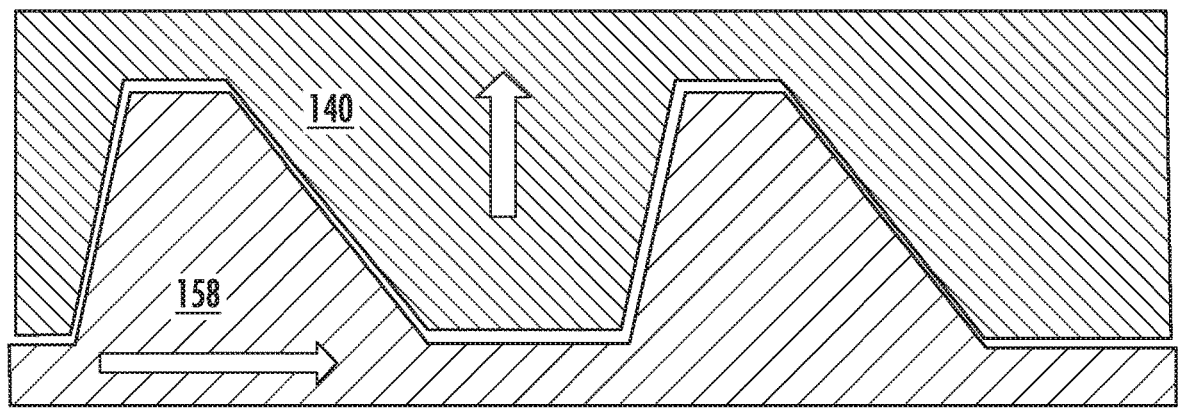
FIG. 9 is a schematic diagram that depicts the cam mechanism of the embodiments of the disconnect apparatus shown in FIGS. 2-8, in which the disconnect apparatus is in an engaged position.
Figure 10:
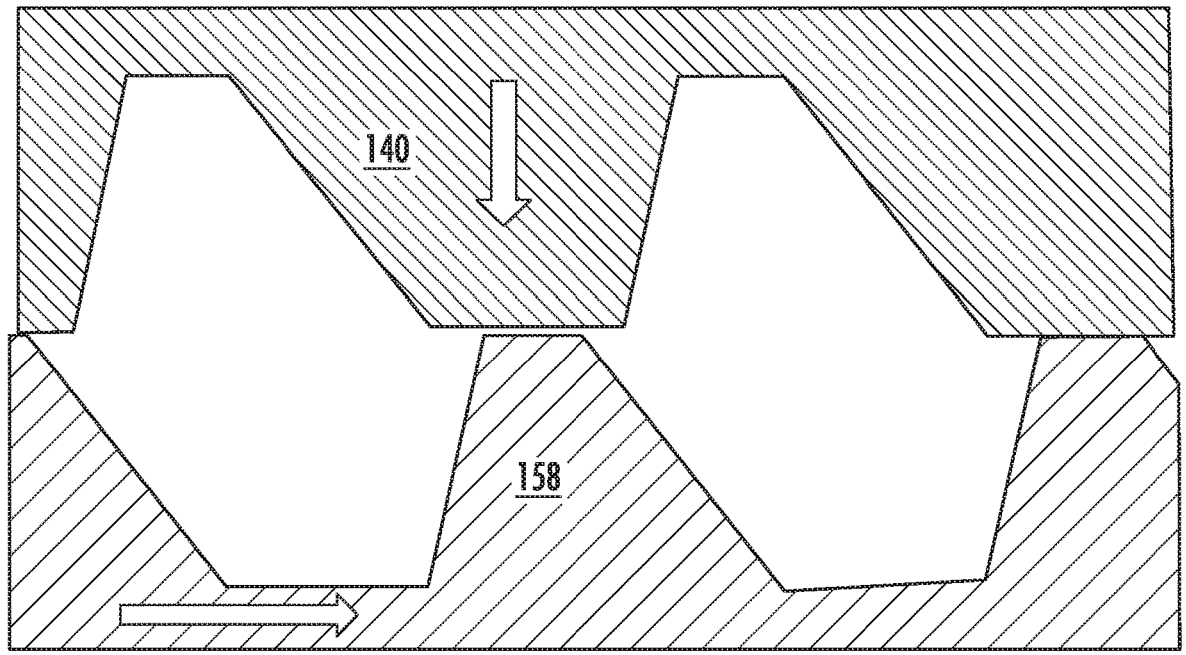
FIG. 10 is a schematic diagram that depicts the cam mechanism of the embodiments of the disconnect apparatus shown in FIGS. 2-8, in which the disconnect apparatus is in a disengaged position.

In the embodiment of the disconnect apparatus 100 illustrated in FIGS. 2-5, there is not necessarily a correlation between the position of the first cam member 140, and the position of the second clutch member 116. The lack of a correlation between the position of the first cam member 140 and the position of the second clutch member 116 may be caused by the unidirectional nature of the cam mechanism including the first cam member 140 and the second cam member 158, and may be caused by the first and second biasing members 130, 154. For example, it may be possible for the first cam member 140 to be at or near a position corresponding with a disengaged disconnect apparatus 100 (see FIG. 10), yet the second clutch member 116 has not translated to a disengaged position. This scenario may occur because the torque on the first clutch member 102 and the second clutch member 116 is too great to permit disengagement, or because the second biasing member 154 is inadvertently in an undesired position. In another example, it may be possible for the first cam member 140 to be at or near a position corresponding with an engaged disconnect apparatus 100 (see FIG. 9), yet the clutch teeth 118, 120 are in a tooth-end on tooth-end position.

In order to ensure the necessary operation, initialization, and/or recovery from a reset of the controller 170, it is necessary to know the actual position of the second clutch member 116 and the actual position of the first cam member 140. Knowing the position of the second clutch member 116 and the position of the first cam member 140 enables the controller 170 to actuate the first cam member 140 to a safe position, or find a reference position for the next actuation sequence.

Figure 17:
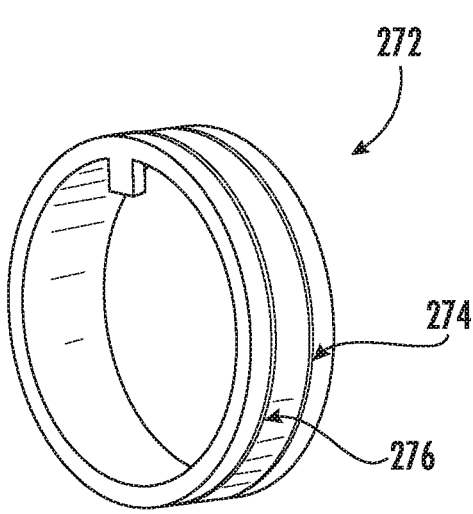
FIG. 17 is a perspective view of a sensor element according to an embodiment of the presently disclosed subject matter.
Figure 18:
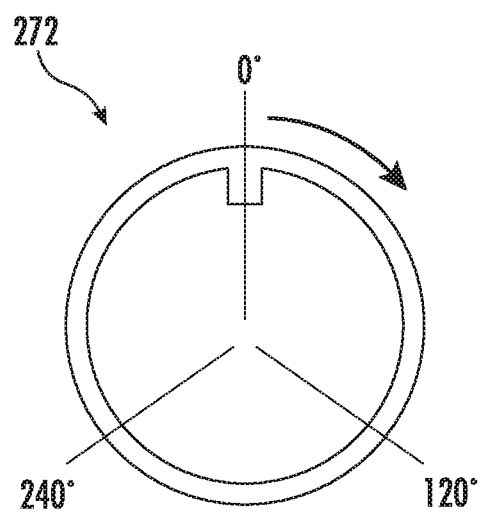
FIG. 18 is a side elevational view of the sensor element shown in FIG. 17.

A sensor assembly 270 (see FIG. 1) may be utilized to determine a state of the disconnect apparatuses 100, 200. In certain embodiments, the sensor assembly 270 may be employed to determine an actual position of the second clutch members 116, 216 of the disconnect apparatuses 100, 200, respectively. In certain embodiments, the sensor assembly 270 includes two or more Hall-effect sensors (not depicted) to determine a rotational position of the second cam members 158, 258. In the embodiment illustrated in FIG. 6, the sensor assembly 270 may further include a sensor element 272 disposed about a radially outer surface of the second cam member 258. It is understood that for the disconnect apparatus 100, the sensor element 272 may be disposed about a radially outer surface of the second cam member 158, if desired. As illustrated in FIGS. 6, 17, and 18, the sensor element 272 may include axially adjacent first and second substantially continuous magnetic paths 274, 276. In other embodiments, the first and second substantially continuous magnetic paths 274, 276 may be disposed directly on the radially outer surface of the second cam members 158, 258, eliminating the sensor element 272. The first and second substantially continuous magnetic paths 274, 276 may comprise North and South poles disposed at predetermined intervals about the circumference of the sensor element 272. The Hall-effect sensors and first and second substantially continuous magnetic paths 274, 276 generate a pulse pattern illustrated in FIGS. 11-14. To generate a desired pulse pattern and determine the position of each of the second cam members 158, 258, at least two Hall-effect sensors generating two signals (i.e., one signal per Hall-effect sensor) are required for each of the second cam members 158, 258. However, more Hall-effect sensor signals may be utilized to generate higher resolution position sensing. The two or more Hall-effect sensors may be disposed adjacent to the first and second substantially continuous magnetic paths 274, 276 disposed on the radially outer surface of the sensor element 272 or the second cam members 158, 258. In another embodiment (not depicted), features may be added to the second cam members 158, 258 which enable the two or more Hall-effect sensor signals to change state pending the reluctance value of the material of the second cam members 158, 258 underneath the respective Hall-effect sensor.

Figure 11:
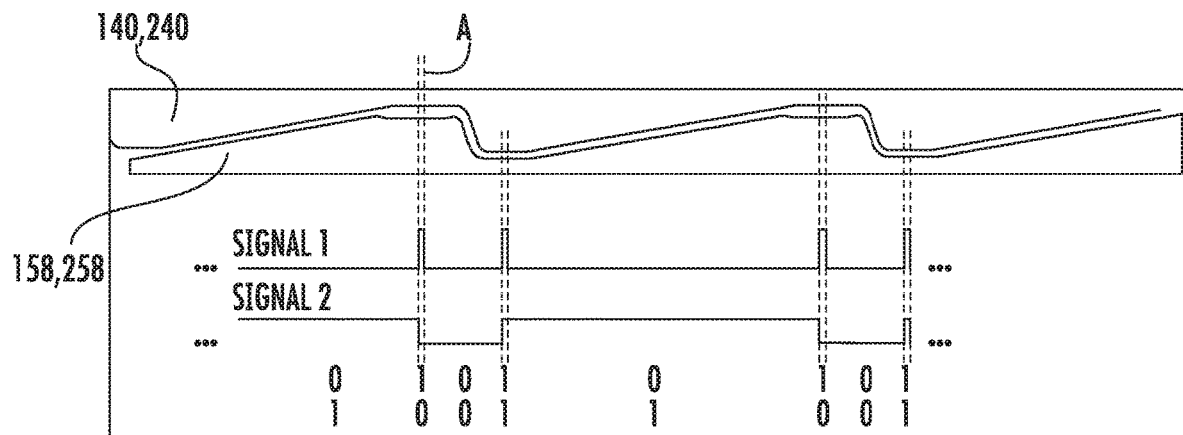
FIG. 11 is a graphical representation that depicts a Hall-effect sensor signal combination for the embodiments of the disconnect apparatus shown in FIGS. 2-8, in which the disconnect apparatus is in an engaged position.

As illustrated in FIGS. 11-14, the pulse pattern generated by the Hall-effect sensors and the sensor element 272 enables four states of the disconnect apparatuses 100, 200 to be determined. As illustrated in FIG. 11, the two or more Hall-effect sensor signals indicate when the second cam members 158, 258 are in an engaged state. Line A illustrates when the pulse pattern generated by the two or more Hall-effect sensor signals indicates that the second cam members 158, 258 are in an engaged state. As illustrated in FIG. 11, in an embodiment, a high (e.g., North) signal from a first Hall-effect sensor, and a low (e.g., South) signal from a second Hall-effect sensor indicate an engaged state of the second cam members 158, 258.

Figure 12:
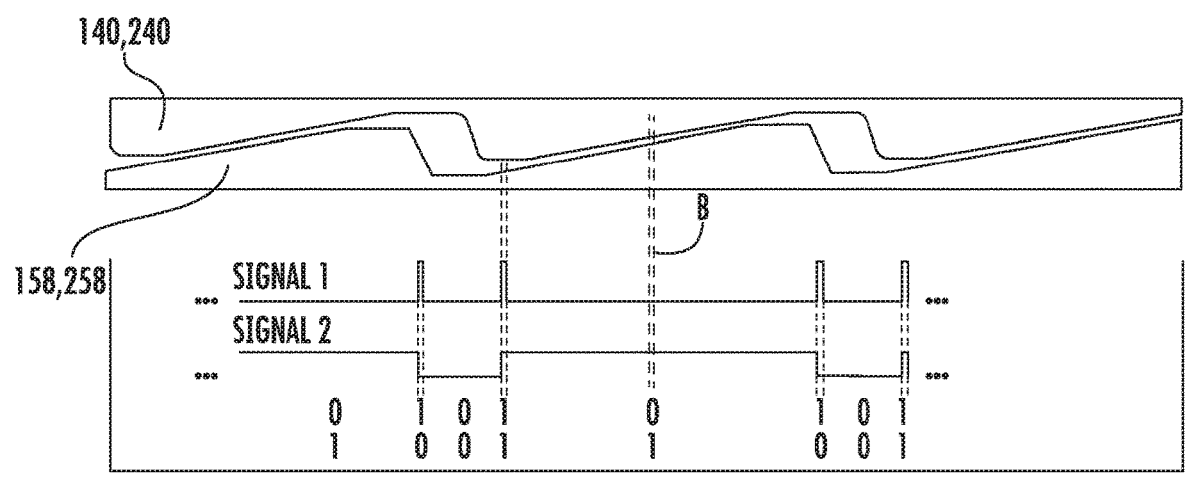
FIG. 12 is a graphical representation that depicts a Hall-effect sensor signal combination for the embodiments of the disconnect apparatus shown in FIGS. 2-8, in which the disconnect apparatus is translating from an engaged position to a disengaged position.

As illustrated in FIG. 12, the two or more Hall-effect sensor signals indicate when the second cam members 158, 258 are in a state of transition between engagement and disengagement. Line B illustrates when the pulse pattern generated by the two or more Hall-effect sensor signals indicates that the second cam members 158, 258 are in a state of transition between engagement and disengagement.

In an embodiment, a low signal from a first Hall-effect sensor, and a high signal from a second Hall-effect sensor indicate a state of transition between engagement and disengagement of the second cam members 158, 258.

Figure 13:
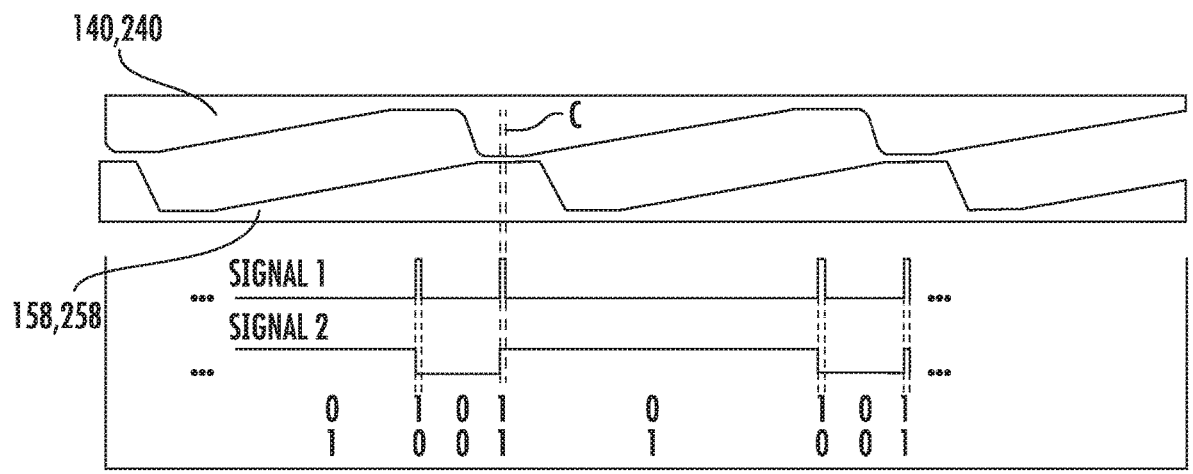
FIG. 13 is a graphical representation that depicts a Hall-effect sensor signal combination for the embodiments of the disconnect apparatus shown in FIGS. 2-8, in which the disconnect apparatus is in a disengaged position.

As illustrated in FIG. 13, the two or more Hall-effect sensor signals indicate when the second cam members 158, 258 are in a disengaged state. Line C illustrates when the pulse pattern generated by the two or more Hall-effect sensor signals indicates that the second cam members 158, 258 are in a disengaged state. In an embodiment, a high signal from a first Hall-effect sensor, and a high signal from a second Hall-effect sensor indicate a disengaged state of the second cam member 158, 258.

Figure 14:
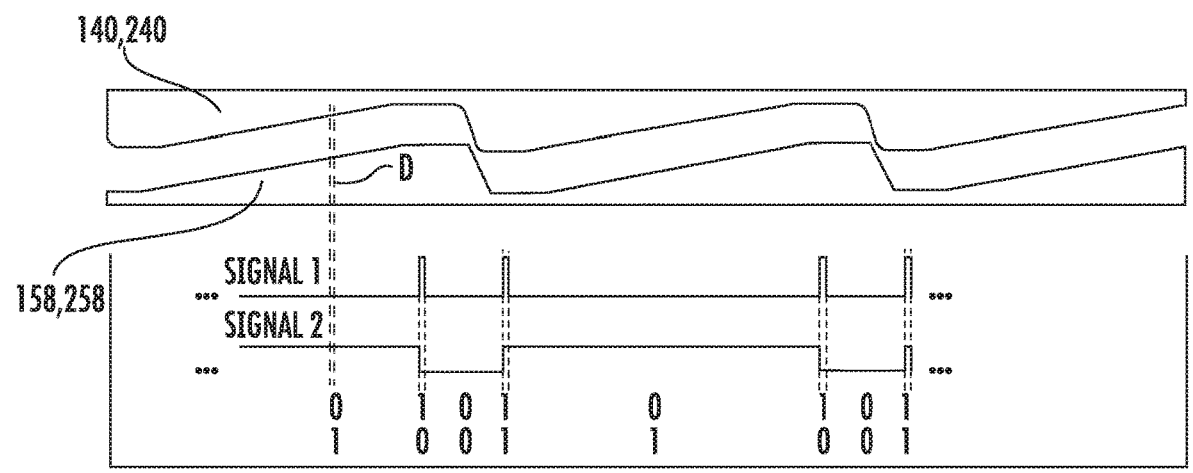
FIG. 14 is a graphical representation that depicts a Hall-effect sensor signal combination for the embodiments of the disconnect apparatus shown in FIGS. 2-8, in which the disconnect apparatus is translating from a disengaged position to an engaged position.

As illustrated in FIG. 14, the two or more Hall-effect sensor signals indicate when the second cam members 158, 258 are in a state of transition between disengagement and engagement. Line D illustrates when the pulse pattern generated by the two or more Hall-effect sensor signals indicates that the second cam members 158, 258 are in a state of transition between disengagement and engagement. In an embodiment, a low signal from a first Hall-effect sensor, and a high signal from a second Hall-effect sensor indicate a state of transition between disengagement and engagement of the second cam members 158, 258.

With reference to FIGS. 11-14, in an embodiment, the pulse width of the two or more Hall-effect signals may not be equidistant. A Hall-effect sensor signal 2 may have a greater width than that of a Hall-effect sensor signal 1.

Figure 15:
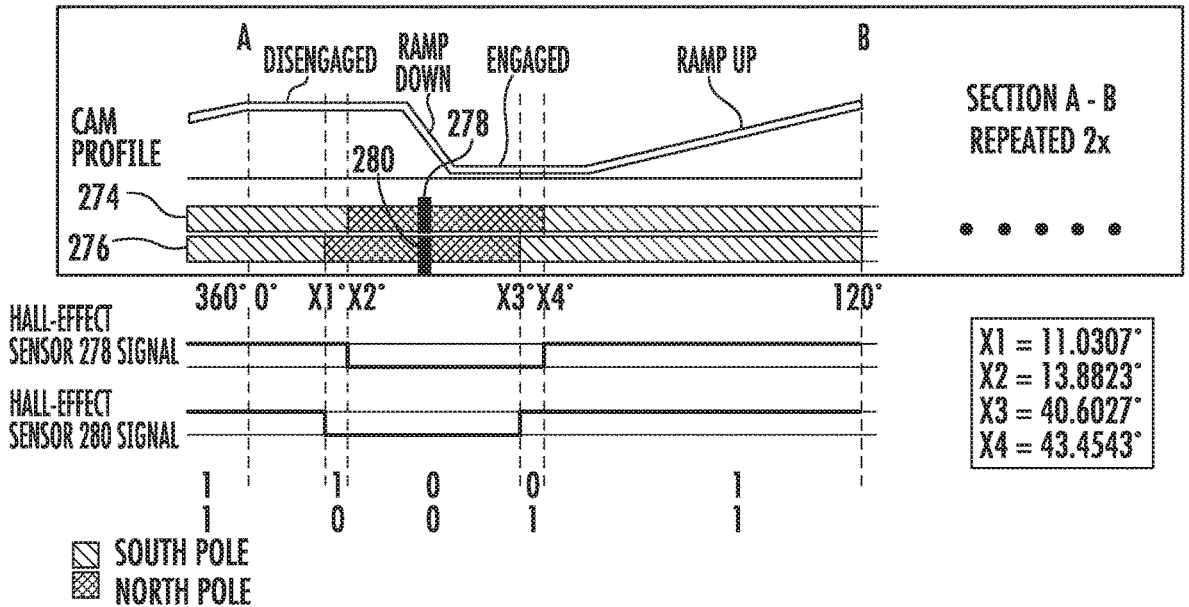
FIG. 15 is a graphical representation that depicts a Hall-effect sensor signal pattern as compared to a cam mechanism profile and a disposition of two substantially continuous magnetic paths.

In an embodiment, as illustrated in FIG. 15, first and second Hall-effect sensors 278, 280 may be disposed directly adjacent to each other within the housing 212 to detect the pole of the corresponding first and second substantially continuous magnetic paths 274, 276. FIG. 15 also schematically illustrates a cam profile 282, and a pulse pattern generated by the first and second Hall-effect sensors 278, 280. As illustrated in FIG. 15, this embodiment utilizes a Gray scale solution to determine the four states (i.e., engaged, disengaging, disengaged, and engaging) of the disconnect apparatuses 100, 200. Only one of the signals of the first and second Hall-effect sensors 278, 280 changes (e.g., high to low, or low to high) to indicate a state change of the disconnect apparatuses 100, 200. Utilizing the Gray scale prevents a scenario where both signals are supposed to change at the same point, and one of the signals improperly changes before the other, indicating an incorrect state of the disconnect apparatuses 100, 200.

Figure 16:
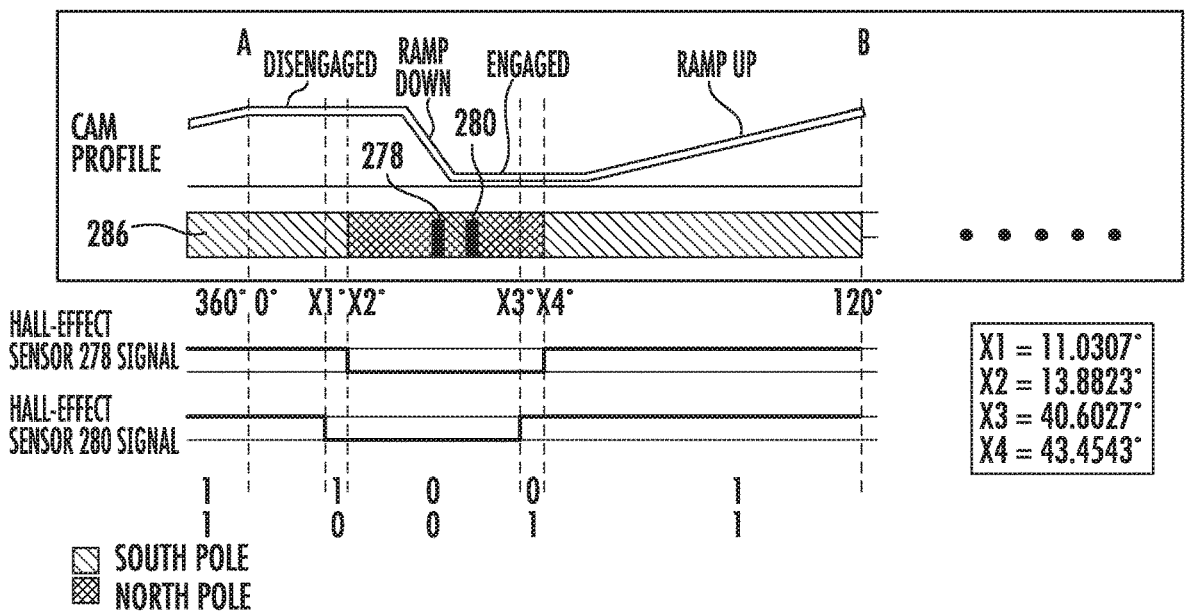
FIG. 16 is a graphical representation that depicts a Hall-effect sensor signal pattern as compared to a cam mechanism profile and a disposition of a single substantially continuous magnetic path.

In another embodiment, as illustrated in FIG. 16, the sensor element 272 may comprise only a single substantially continuous magnetic path 286. The first and second Hall-effect sensors 278, 280 may be disposed angularly adjacent to one another, and disposed radially adjacent to the substantially continuous magnetic path 286 (i.e., the first and second Hall-effect sensors 278, 280 may be circumferentially spaced, radially adjacent to the sensor element 272). In the embodiment of the disconnect apparatuses 100, 200 position sensing design illustrated in FIG. 16, two of the states are required to have the same angle of the substantially continuous magnetic path 286. For example, the engaged and disengaged states of the disconnect apparatuses 100, 200 may both have a substantially continuous magnetic path angle of approximately five degrees.

In this way, the first and second Hall-effect sensors 278, 280 may generate the same pulse pattern generated in the embodiment discussed in relation to FIG. 15. However, utilizing one substantially continuous magnetic path permits the use of a thinner sensor element 272. Additionally, a sensor element 272 having only one substantially continuous magnetic path is cheaper to manufacture because the precise locating of two substantially continuous magnetic paths relative to one another is avoided. Further, utilizing only one substantially continuous magnetic path reduces signal interference because there is no possibility of the second Hall-effect sensor 280 reading the substantially continuous magnetic path associated with the first Hall-effect sensor 278 and vice versa.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A method of sensing a state of a disconnect apparatus, comprising:
   providing a first clutch member;
   providing a second clutch member in selective engagement with the first clutch member;
   providing a cam mechanism configured to selectively actuate the disconnect apparatus, the cam mechanism comprising axially opposed complimentary shaped cam ramps;
   providing a sensor assembly including at least one sensor configured to sense at least one substantially continuous magnetic path;
   generating a pulse pattern utilizing the at least one sensor of the sensor assembly; and
   determining a position of the cam mechanism utilizing the pulse pattern, wherein the pulse pattern enables an engaged state of the disconnect to be determined, a disengaged state of the disconnect to be determined, and a state of transition of the disconnect to be determined, the state of transition including at least one of an engaging state and a disengaging state.

2. The method of claim 1, wherein the at least one sensor is a Hall-effect sensor.

3. The method of claim 1, wherein the sensor assembly further includes a sensor element disposed about the cam mechanism.

4. The method of claim 3, wherein the at least one substantially continuous magnetic path is formed on at least one of the cam mechanism and the sensor element.

5. The method of claim 4, wherein the at least one substantially continuous magnetic path includes at least one North pole and at least one South pole disposed at predetermined intervals about a circumference of the at least one of the cam mechanism and the sensor element.

6. The method of claim 1, further comprising the step of determining a state of the disconnect apparatus based upon the position of the cam mechanism.

7. The method of claim 1, wherein the cam mechanism includes a first cam member and a second cam member; and wherein the at least one sensor is disposed about a radially outer surface of the second cam member, the method further comprising providing a continuous magnetic path adjacent the at least one sensor.

8. The method of claim 7, wherein the at least one sensor is a Hall-effect sensor.

9. The method of claim 7, wherein the pulse pattern enables four states of the disconnect apparatus to be determined including engaged, disengaging, disengaged, and engaging.

10. The method of claim 1, wherein at least two sensors are provided generating two separate signals, where only one of the signals of the first and second sensors changes from high to low or low to high to indicate a state change of the disconnect apparatus.

11. A method of sensing a state of a disconnect apparatus, comprising:
providing a first clutch member;
providing a second clutch member in selective engagement with the first clutch member;
providing a cam mechanism configured to selectively actuate the disconnect apparatus, wherein the cam mechanism includes a first cam member and a second cam member;
providing a sensor assembly including at least one sensor configured to sense at least one substantially continuous magnetic path, wherein the at least one sensor is disposed about a radially outer surface of the second cam member;
providing a continuous magnetic path adjacent the at least one sensor;
generating a pulse pattern utilizing the at least one sensor of the sensor assembly; and
determining a position of the cam mechanism utilizing the pulse pattern, wherein the pulse pattern enables four states of the disconnect apparatus to be determined including engaged, disengaging, disengaged, and engaging.

12. The method of claim 11, wherein the sensor assembly further includes a sensor element disposed about the cam mechanism.

13. The method of claim 12, wherein the at least one substantially continuous magnetic path is formed on at least one of the cam mechanism and the sensor element.

14. The method of claim 13, wherein the at least one substantially continuous magnetic path includes at least one North pole and at least one South pole disposed at predetermined intervals about a circumference of the at least one of the cam mechanism and the sensor element.

15. The method of claim 11, further comprising the step of determining a state of the disconnect apparatus based upon the position of the cam mechanism.

16. The method of claim 11, wherein the at least one sensor is a Hall-effect sensor.

17. The method of claim 11, wherein at least two sensors are provided generating two separate signals, where only one of the signals of the first and second sensors changes from high to low or low to high to indicate a state change of the disconnect apparatus.

18. A method of sensing a state of a disconnect apparatus, comprising:
providing a first clutch member;
providing a second clutch member in selective engagement with the first clutch member;
providing a cam mechanism configured to selectively actuate the disconnect apparatus;
providing a sensor assembly including at least one sensor configured to sense at least one substantially continuous magnetic path;
generating a pulse pattern utilizing the at least one sensor of the sensor assembly; and
determining a position of the cam mechanism utilizing the pulse pattern,
wherein at least two sensors are provided generating two separate signals, where only one of the signals of the first and second sensors changes from high to low or low to high to indicate a state change of the disconnect apparatus.

19. The method of claim 18, further comprising the step of determining a state of the disconnect apparatus based upon the position of the cam mechanism.

20. The method of claim 18, wherein the state of change of the disconnect includes disengaging and engaging, and wherein the pulse pattern enables four states of the disconnect apparatus to be determined including engaged, disengaging, disengaged, and engaging.

* * * * *